Jan. 11, 1949.    P. B. SCHARF    2,459,047
METHOD AND APPARATUS FOR ELECTRIC ARC WELDING
Filed March 25, 1944    4 Sheets-Sheet 1

INVENTOR.
PAUL B. SCHARF
BY
Robert E. Burns
ATTORNEY.

Jan. 11, 1949.  P. B. SCHARF  2,459,047
METHOD AND APPARATUS FOR ELECTRIC ARC WELDING
Filed March 25, 1944  4 Sheets-Sheet 2

INVENTOR.
PAUL B. SCHARF
BY
Robert E. Burns
ATTORNEY.

Jan. 11, 1949. P. B. SCHARF 2,459,047
METHOD AND APPARATUS FOR ELECTRIC ARC WELDING
Filed March 25, 1944 4 Sheets-Sheet 4

INVENTOR.
PAUL B. SCHARF
BY
Robert E. Burns
ATTORNEY

Patented Jan. 11, 1949

2,459,047

UNITED STATES PATENT OFFICE 2,459,047

METHOD AND APPARATUS FOR ELECTRIC ARC WELDING

Paul B. Scharf, Bradford, Pa., assignor to Dresser Industries, Inc., a corporation of Pennsylvania Application March 25, 1944, Serial No. 528,049

18 Claims. (Cl. 219—10)

My invention consists in the novel features hereinafter described, reference being had to the accompanying drawings which illustrate three forms of apparatus for carrying my invention into effect, selected by me for purposes of illustration, and the said invention is fully disclosed in the following description and claims.

My invention consists in a novel process and apparatus for automatically welding the adjacent edges of metal sections and stated in simple terms it comprises repeatedly traversing said edges with one or more moving electric arcs at such rate as to heat the said edges to welding temperature substantially simultaneously throughout their extent and thereupon forcing the said abutting edges together to effect a weld. It will be understood that each passage of the arc along the weld lines will increase the temperature of the meeting edges and that repeated passages will result in heating the edges to welding temperature uniformly throughout the extent of the weld line. The rate of movement and frequency at which the arc traverses the weld line is such that the heat of the arc which serves as a high intensity heat source, is distributed uniformly along the edges in a narrow band so that the edges are quickly heated to welding temperature throughout their length and the dissipation of heat back into the body of the material is kept at a minimum. This results in greater efficiency and at the same time avoids the deleterious effect of heating the material back of the weld line, such as scaling and changes in temper and granular structure.

The relative movement of the arc along the weld line may be achieved by movement of the sections being welded, or by movement of the arc, or both. For example, movement of the arc can be effected by moving an arcing element, such as a carbon electrode along the weld line. Thus, in accordance with the invention, I form an arc between the edges serving as one electrode, and an arcing element serving as the other, and cause the arc repeatedly to travel along the weld line by relative movement of the arcing element and the edges. It will be understood that either a single arc or a plurality of arcs may be employed as desired.

During the heating of the edges by the arc, the edges are preferably in contact with one another. When welding temperature has been reached throughout the extent of the weld line, the edges are forced together with sufficient pressure to effect a weld. The heating may thereupon be discontinued immediately or may be decreased gradually to control the temperature of the metal and prevent too rapid cooling.

It will be apparent that the method of welding in accordance with the present invention is applicable not only to flat or curved plates, but also to objects of cylindrical cross section. For example, my invention provides a rapid economical and highly satisfactory method of welding sections of pipe or other cylindrical sections, both in the factory and in the field. To assist in understanding my invention, and the manner in which it is carried out, I have illustrated in the accompanying drawings several forms of apparatus for welding pipe sections including piling, well casings, etc. by my improved process. It will be understood, however, that the invention is not limited to the specific forms of apparatus shown by way of example in the drawings or to the welding of cylindrical sections, but is of wide applicability.

The apparatus shown in the drawings to illustrate by way of example the application of my improved method to the automatic welding of the abutting ends of pipe sections, comprises means for establishing an electric arc between an electrode or arcing element and the edges to be welded and then effecting relative movement between the arcing element and the meeting ends of the two pipe sections to cause the arc to travel around the weld line at sufficient velocity to heat the meeting edges of the pipe sections to welding temperature substantially uniformly and simultaneously throughout their circumferential extent. When welding temperature has been reached, I prefer to apply force to one or both of the adjacent pipe sections to press the heated edges together and complete the weld. This can be accomplished by forcing one of the sections toward the other, or by simultaneously forcing the two sections toward each other, according to the conditions under which the process is to be carried out. For example, my improved process can be advantageously employed in a factory where it is desired to unite by welding the meeting ends of two comparatively short pipe sections to form a longer continuous pipe section, and it is also capable of being carried out in the field where it is desired to unite a pipe section of any particular length to an adjacent section of continuous pipe lines, such as are used for the conveyance of gases and liquids for long distances across country.

Figure 1:
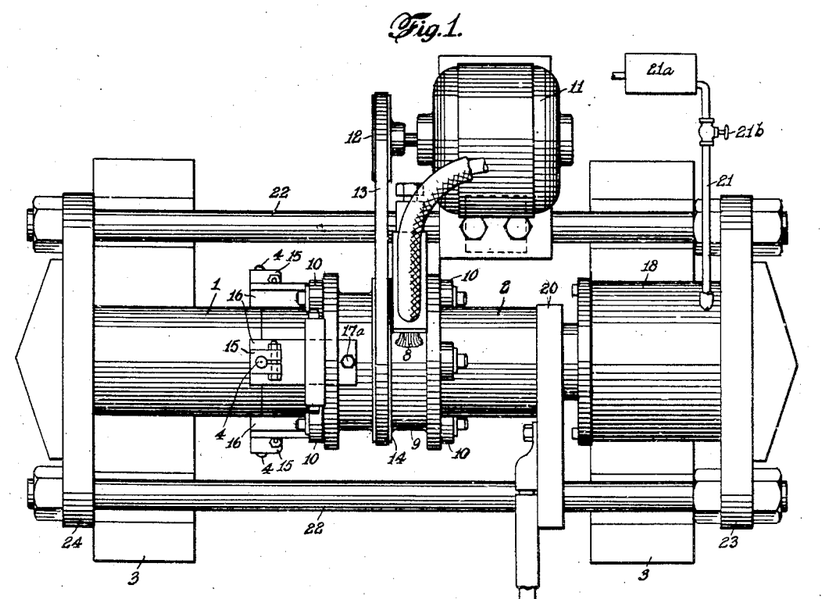
Fig. 1 represents a plan view of an apparatus suitable for welding the meeting ends of short sections of pipe where the operation is to be performed in a factory and the various parts are stationarily supported.
Figure 2:
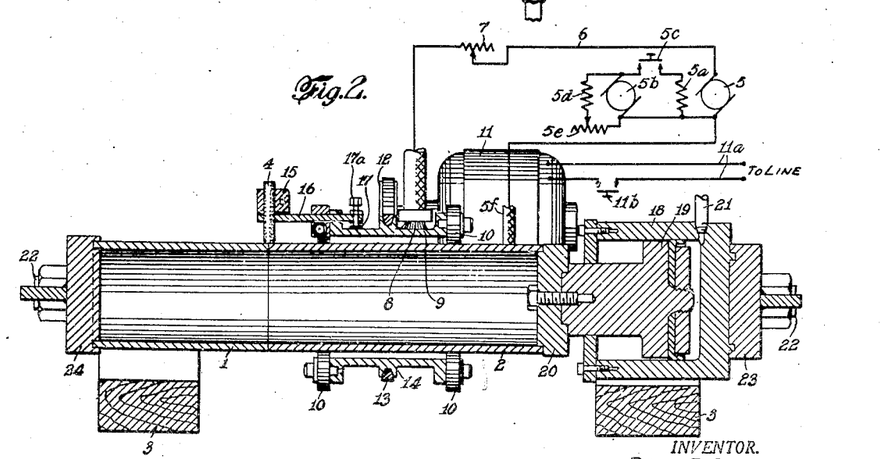
Fig. 2 represents a vertical sectional view of the apparatus illustrated in Fig. 1, showing diagrammatically the electric circuits employed in carrying out my improved process.

Referring first to the form of apparatus illustrated in Figs. 1 and 2, the reference numerals 1 and 2 represent the separate pipe sections to be united by welding, in accordance with my improved process where the welding operation can be performed with the apparatus in stationary position, as in a factory, for the welding of short lengths of pipe together. In this instance the pipe section 1 is rigidly supported by a bench or supporting frame, indicated at 3, in which it is held from rotation, and the pipe section 2 is supported in abutting relation to the pipe section 1 preparatory to welding them together. The heat necessary to raise the meeting edges of the pipe sections 1 and 2 to welding temperature is provided in this instance by the formation of electric arcs between electrodes, indicated at 4, and the pipe sections themselves, which are grounded in any suitable manner. Three equally spaced electrodes are shown in the drawings, but it will be understood that any desired number and spacing may be used. Arc forming current of sufficient magnitude is supplied from a suitable source, in this instance from a generator, indicated at 5, in the wiring diagram. Current for the field of the generator 5 is supplied by a generator or winding 5b through connections controlled by a contactor 5c. The field 5d of the generator or winding 5b is in turn regulated by a variable resistance 5e. One terminal of the generator 5 is grounded to the pipe sections by a connection 5f, while the other is connected by a conductor 6, in which is located a variable ballast resistor 7, to a brush 8, engaging a collector ring indicated at 9 which in this instance is rotatably mounted on the pipe section 2 by means of insulated rollers 10. The collector ring 9 supports and carries the arc forming electrodes 4. It is to be understood that in the operation of this mechanism, in accordance with my process, the arc forming electrodes 4 may be rotated around the pipe sections, or the pipe sections themselves may be rotated with respect to the arc forming elements 4, it being only necessary to establish relative rotation between the parts mentioned. In the present instance I have shown a construction in which the arc forming elements 4 and the collector ring 9 are rotated about the pipe section 2 by means of a suitable motor, indicated at 11, and in this instance operating a driving pulley 12 connected by a belt 13 with a pulley 14 on the collecting ring 9. The motor 11 is connected to a source of electricity by conductors 11a and is controlled by a contactor 11b.

Each of the arc forming elements 4, which may for example be of carbon, is supported in a clamp 15 in this instance supported at the outer end of a lever 16 pivotally mounted on the collecting ring 9 and actuated by means of a spring 17 so as to press the electrodes 4 into engagement with the meeting edges of the pipe sections 1, 2. The operation of the apparatus is initiated by closing the contactors 5c and 11b, which excites the field of generator 5, thereby furnishing the necessary electric current to electrodes 4 and also starting the motor 11 to rotate the collecting ring and electrodes 4 around the pipes. In order to form arcs between the electrodes 4 and the pipe sections, means is provided for moving the electrodes out of contact with the pipe. This may be done in any desired manner, e. g., by means of a solenoid. However, in the embodiment shown, the electrodes are mounted in such manner that the centrifugal force acting on the electrodes 4 and their clamps and connections will lift the outer ends of the levers 16 against the spring 17 and permit the formation of arcs which are carried around the pipe sections to heat the abutting edges thereof. The distance the electrodes are moved outwardly, and hence the length of the arc, is adjustably limited by the set screws 17a. The speed of relative revolution of the arc forming electrodes 4 and the pipes is an important feature of my invention and is sufficiently great to effect the heating of the metal of the abutting edges of the pipes throughout their circumferences to a substantially uniform temperature as the arc forming electrodes move relative to the pipes. Moreover it has been found that the rapidly rotating arc produces a non-oxidizing envelope around the heated edges so that oxidation and scaling of the edges is inhibited. It has also been observed that the rotating arc apparently forms an ionized arc stream encircling the pipe, so that when a plurality of electrodes are used, one electrode will pick up its arc from the arc stream of another electrode. The required rate of revolution is a function of the diameter of the pipe being welded and of the number and spacing of the arcs employed. However, I have found in actual practice that in welding four inch standard pipe and using a single arc, a speed of approximately eight hundred revolutions per minute will accomplish this result quickly, bringing the meeting edges of the pipe sections under treatment to welding temperature throughout their circumference. When thus moved at a speed of the order of hundreds of inches a minute, the arc has been found to travel by jumping from spot to spot along a narrow path extending around the circumference of the pipe. Each spot of impingement of the arc is of small diameter with the result that the current concentration at each spot is very high with a correspondingly high $I^2R$ heating effect which appears to be the predominant factor in heating the metal along the weld line. The rapidly rotating constricted arc thus heats a narrow band of material adjacent the weld surfaces concurrently throughout its entire circumferential extent.

The arcing and rotating are continued until the meeting edges of the pipe sections are heated to welding temperature, whereupon all that is necessary to complete the weld is to force the heated and abutting ends of the pipe sections together. This may be accomplished by any suitable means, for example, by a cylinder indicated at 18 containing a piston 19 and operatively connected with a pushing plate 20 engaging one of the pipe sections, in this instance the section 2, and thereby forcing the abutting edges of the pipe sections 1 and 2, which are at welding temperature, into such intimate contact that a strong weld is formed. The cylinder 18 is supplied with pressure fluid by means of a pipe 21, which is connected with a source of pressure fluid 21a under the control of a suitable valve 21b, which is operated as soon as the rotary arc forming elements 4 have brought the meeting ends of the pipe sections to the welding temperature. It will be understood that the cylinder 18 is operatively connected with the pipe section 1, in this instance by longitudinal tie-rods 22, operatively connected with a crossbar 23 connected with the cylinder at one end of the apparatus, and also connected with a crossbar 24 at the other end of the apparatus which engages the end of the pipe section 1 beyond the weld. When the heating operation is completed the contactors 11b and 5c are opened to stop the motor and discontinue the supply of electric current to the arc forming elements. This may be done just before pressing the pipe ends together, or if desired, the heating may be continued, for example with diminished current, to heat treat the weld area after the weld is formed.

The operation hereinbefore described is particularly suitable for the welding of comparatively short cylindrical sections together to form longer sections, when the operation is conducted in the factory and by stationarily supported apparatus. It will be understood that in welding short sections the pipe can be rotated, for example, on a lathe, and the electrodes held stationary. When the welding operation is to be performed in the field and a series of pipe sections are to be welded together to form a continuous pipe line to be subsequently in most instances embedded in the ground, it is necessary to provide apparatus which can be moved from one weld to another and in this case it is generally preferable to rotate the arc forming element or elements with respect to the pipe sections forming the pipe line.

Figure 3:
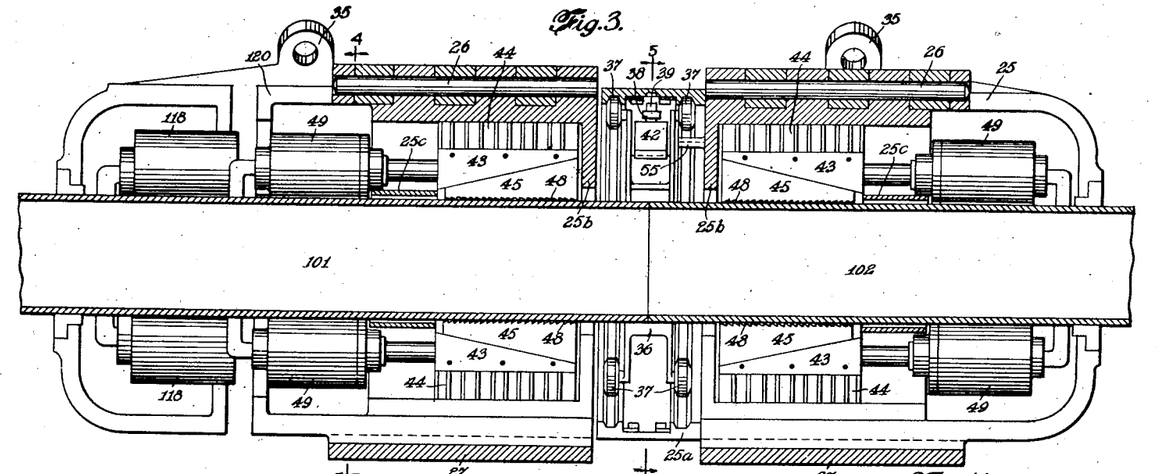
Fig. 3 is a vertical sectional view of one form of apparatus capable of being used in the field for the purpose of uniting a section of pipe by welding to the adjacent pipe section of a pipe line in the course of laying the pipe.

In Figs. 3 to 9 of the drawing I have illustrated a suitable apparatus for carrying out my improved process in the field for the purpose described. The welding apparatus illustrated in section in Fig. 3 comprises a unit having an elongated frame or housing 25, which is preferably formed in two sections divided longitudinally and secured together along the upper side of the unit by hinge bolts 26 and adapted to be secured at the opposite side by means of a latch indicated at 27 in Fig. 4. The unit as a whole is adapted to be suspended from and carried by a motor vehicle which can be propelled over the ground in the vicinity of the pipe line so as to bring the unit in proper relation with the meeting ends of two abutting sections which are to be welded together. I have shown such an arrangement in Fig. 12, in which a motor vehicle, in this instance of the track laying type, is shown as a whole at 28, and is shown provided with a pivoted support 29 having a pulley 30 at its outer end over which a cable 31 passes from a winding drum 32 on the vehicle 28 to a longitudinal bar 33, which in turn is connected by links 34 to perforated ears 35 on the exterior of the unit casing 25. The object of having the unit casing in this form of apparatus is to permit it to be closed firmly around the meeting ends of the pipes, as shown in Fig. 3, during the welding operation, and also to permit it to be opened and moved to the next weld.

Within the frame or housing 25 of the welding unit there is provided a rotary frame 36 having rollers 37 for engaging a track 25a carried by the housing. The rotary frame 36 is shown in the form of an inflated U, making it unnecessary for the frame to be hinged or jointed, as it will slip readily over the pipe when the unit is placed thereon. This rotary frame carries the arc forming elements, and in this instance I have shown it provided with a plurality of such elements, each comprising an electrode 104 shown as a carbon rod, and adjustable clamping means 115 for supporting the electrode in proper position with respect to the meeting edges of the adjacent pipe sections to be connected. The clamp 115 is capable of radial outward movement when the rotary frame is being rotated for the purpose of separating the electrodes 104 from the adjacent portions of the abutting ends of the pipe and producing the arcs, as hereinbefore described. In the embodiment shown in the drawings, the clamp 115 is carried by parallel pivoted arms 115a movable in a plane perpendicular to the axis of the pipe so that the electrode 104 maintains its correct alignment with the ends of the pipe sections during its outward movement. A spring 115b holds the electrodes in contact with the pipe when the rotary frame 36 is stationary, the electrode being moved outwardly by centrifugal force, or other suitable means, e. g., a solenoid, against the action of this spring when sufficient speed of rotation is attained. An adjustable stop 115c limits the outward movement of the electrode to provide the proper length of arc between the electrode and the ends of pipe sections.

The rotary frame 36 (Fig. 5) is rotated within the housing 25 by means of an electric motor, indicated at 111, the shaft of which is connected by gearing with the adjacent roller 37, which engages the inner surface of the track 25a with a sufficient amount of friction to enable the entire rotary frame to be rotated on the track 25a, carrying with it the arc forming elements 104 and subjecting the meeting ends of the pipe sections to the intense heat of the arc, entirely around the same, so as to bring the meeting edges of the adjacent pipe sections to welding temperature around the entire circumference of the pipe ends. It will be understood that in this embodiment of the apparatus, the path of travel of the arc forming element 104 is determined by the position of the track 25a with respect to the pipe sections and that the path of travel can hence be adjusted by adjusting the position of the track. The track will ordinarily be centered on the pipes, but in some instances it may be slightly off center, for example to provide equal heating at the top and bottom of the pipe sections, or to provide greater heating at one portion than another, for example to compensate for differences in wall thickness. The track 25a may also be adjusted longitudinally of the pipe so that the electrodes will be in proper alignment with the weld line.

Figure 11:
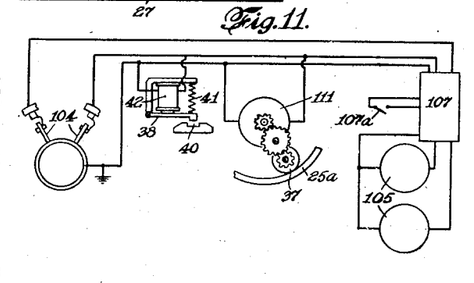
Fig. 11 is a diagrammatic view illustrating the electric circuits conveniently employed in this form of the apparatus.

In Fig. 11 there is shown diagrammatically, and by way of example, electric circuits for the apparatus. Electric current for the electrodes 104 is supplied by suitable A. C. or D. C. power sources, for example generators 105, connected with the pipe and the electrodes through a control and ballast box 107 and contactor 107a. The motor 111 may be connected across one of the welding circuits so that power is supplied simultaneously to the electrodes and the motor, or it may be on a separate current. The operation of the welding machine is initiated by closing contactor 107a, thereby energizing the arc forming circuits and starting the motor 111 for running the rotary frame 36 at the desired speed, and thereupon by centrifugal action or other means, causing the clamps 115 to move outwardly and separate the arc forming elements 104 from the adjacent portions of the pipe sections to produce arcing and thereby raise the meeting edges of the pipe sections, indicated at 101 and 102, to welding temperature. When the heating action is completed the contactor 107a is opened, thereby cutting off power from the arcing electrodes 104 and preventing further arcing, while the motor 111 will also be cut out, permitting the rotation of the rotary frame 36 to cease.

Figures 4, 5, 6, 7, 14:
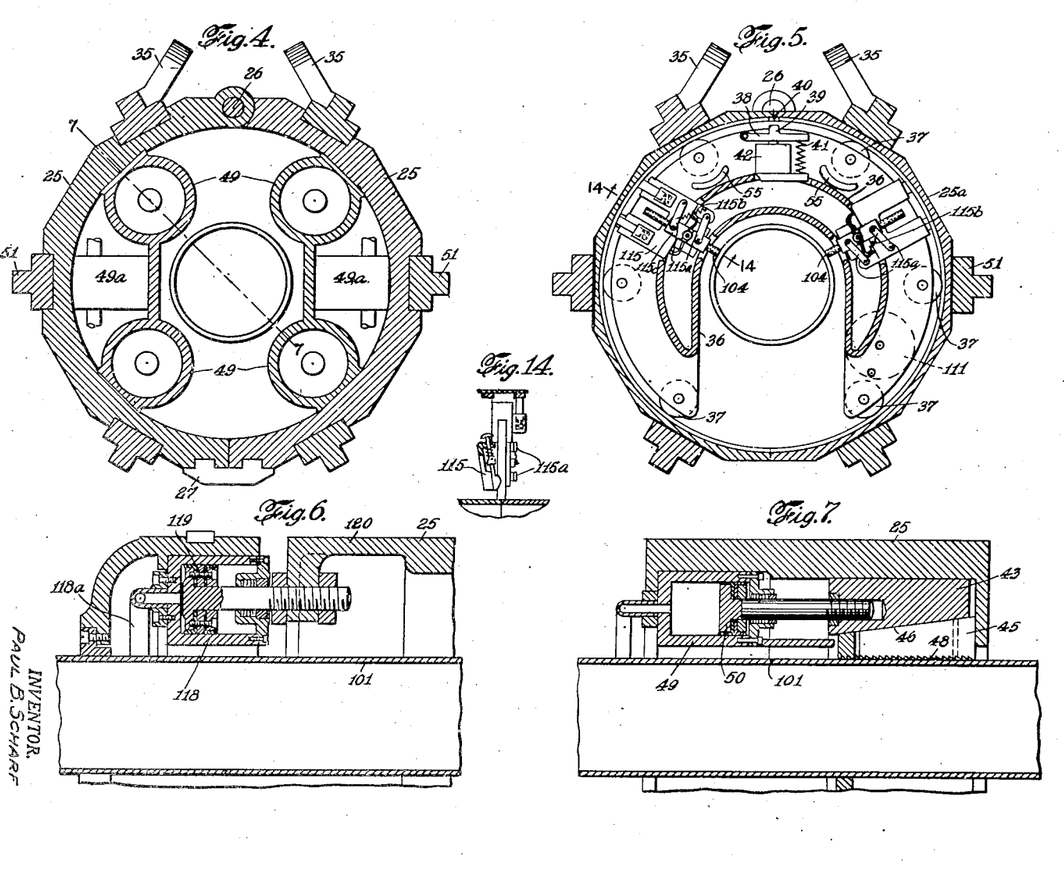
Fig. 4 represents a section through the apparatus, illustrated in Fig. 3, taken on the line 4—4 thereof.
Fig. 5 is a similar section of the apparatus illustrated in Fig. 3 taken on the line 5—5 thereof.
Fig. 6 is a partial longitudinal section similar to the left hand portion of Fig. 3, but showing one of the pushing cylinders in section.
Fig. 7 is a partial section on the line 7—7 of Fig. 4.
Fig. 14 is a partial section taken approximately on the line 14—14 in Fig. 5.
Figures 8, 9:
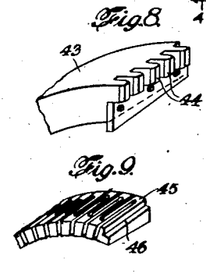
Fig. 8 is a detail perspective view of a portion of the endwise movable exterior shell forming a part of the means for clamping it to that portion of one of the pipe sections which it surrounds.
Fig. 9 is a detail perspective view of a portion of the interior clamping shell for engaging the enclosed pipe section.

I prefer to provide means for stopping the rotary frame 36 after the formation of the weld, in the position indicated in Fig. 5, in which it is in the inverted U position, so that the entire welding unit can be readily lifted off the pipe as explained hereinafter. For this purpose I have shown a latch bar 38 pivoted to the rotary frame and provided with a locking projection 39 for engaging a recess 40 in track 25a of the housing 25, to lock the rotary frame 36 when it comes into the desired position. The locking lever 38 is normally pressed outwardly toward the housing 25 and into locking position by a spring 41. I provide the latch lever 38 with an electro-magnet or solenoid which is connected across one of the welding circuits as shown, and aids to withdraw the lever 38 and release the rotary frame 36 when the circuits through the electrodes and motor 111 is closed by contactor 107a. When the contactor 107a is opened and the motor and rotary frame slows down, the solenoid or magnet 42 will release the latch lever 38 and permit the spring to force the locking projection 39 into the recess 40 and arrest the rotary frame in the desired position, as indicated in Fig. 5. I do not, however, desire to be limited to the exact details of construction of this locking means, as other forms of locking devices which will accomplish the desired result may be employed.

As the housing 25 is of hinged construction, as described above, it can be opened up to be applied to and subsequently removed from the pipe being welded. By reason of the U-shape of the rotary frame 36 carrying the electrodes this frame is removable along with the complete unit, as it will lift freely off the pipe when in the position shown in Fig. 5. To maintain the rotary frame 36 and the housing 25 in proper relation to one another when the unit is removed from the pipe, means is preferably provided to prevent the frame 36 from dropping down when the housing 25 is opened up. In the example shown in the drawings, this is accomplished by providing brackets 55 (Fig. 5) which engage and support rollers 37 of frame 36. It will be understood that when the housing 25 is closed, the brackets 55 carried by the frame or housing are swung inwardly and the frame 36 may also be lifted slightly by engagement of its rollers with the lower portions of the track 25a, so that the rollers 37 do not strike the brackets 55 when the frame 36 is rotated.

When the adjacent ends of the two pipe sections have been raised to welding temperature by the rotating arcs, the two ends are forced together to complete the weld. To insure proper alignment of the pipe sections during welding and to effect relative movement of the sections to press the ends together when welding temperature has been reached, the unit is provided with clamping and push-up mechanism, as illustrated in Figs. 3, 4, 6, 7, 8 and 9.

Within the housing 25 and at each end thereof, I provide a circular series of pressure clamp operating cylinders 49, operatively connected with gripping mechanism, which forcibly grips the adjacent pipe sections when supplied with pressure fluid, for example from manifolds 49a. In the drawings I have illustrated in Figs. 3 and 7, for example, a piston 50, in each of said cylinders, connected with a movable sleeve 43, a portion of one of these sleeves being shown in detail in Fig. 8. These sleeves are formed in two halves corresponding to the halves of the housing 25, and the meeting edges thereof are provided with intermeshing portions, indicated at 44 in Figs. 3 and 8. Each of the sleeves 43 has provided with it a secondary sleeve 45, a portion of one of said sleeves 45 being shown in detail in Fig. 9. These gripping sleeves 45 have their outer surfaces beveled, as indicated at 46 in Fig. 7, and their inner faces serrated as indicated at 48, and the inner faces of the exterior sleeve 43 is likewise beveled, so as to correspond with the outer surface 46 of the sleeve 45. The gripping sleeves 45 are held against longitudinal movement by an inwardly projecting flange 25b of the housing 25 and by a back-up ring 25c, so that the operation of the piston 50 in each of the cylinders 49 will have the effect of producing a relative wedging movement between the two sleeves 43 and 45, forcing the latter sleeves into firm contact with the pipe extending therethrough, and locking the enclosed pipe section firmly to the contiguous portion of the frame or housing 25. In this manner each of the pipe sections is independently and rigidly connected with the adjacent portion of the housing 25.

The welding unit is also provided with means, which I term the push-up elements, to force the meeting ends of the pipe sections toward each other while the abutting portions thereof are at welding heat, to finally produce the weld. The "push-up" may be accomplished by toggle, cam or other suitable means. However, in the embodiment shown in Figs. 3 to 9 of the drawings, the push-up is effected by means of a second circular series of cylinders and pistons provided at one end of the frame or housing 25. Pressure fluid for operating the push-up mechanism may be supplied to the cylinders through a suitable conduit or manifold indicated at 118a in Fig. 6. One of these pushing cylinders is shown in detail in Fig. 6, in which the cylinder is indicated at 118 and the piston therein at 119. Each of the pistons 119 is connected with an independently movable adjacent portion of the housing, indicated at 120, which is capable of slight longitudinal movement with respect to the other portion of the housing, sufficient to force the abutting ends of the pipe sections while at welding heat toward each other and effect the weld.

In order to permit the pushing cylinders and pistons to operate effectively in this manner, the operation of the portion of the housing 25 in which the cylinders 118 and pistons 119 are located, is slidably connected with the relatively movable portion of the housing adjacent thereto, by a series of longitudinally extending bars 51 and clearly shown in Figs. 4 and 5, which also serve to strengthen the construction of the housing 25.

Figures 12, 13:
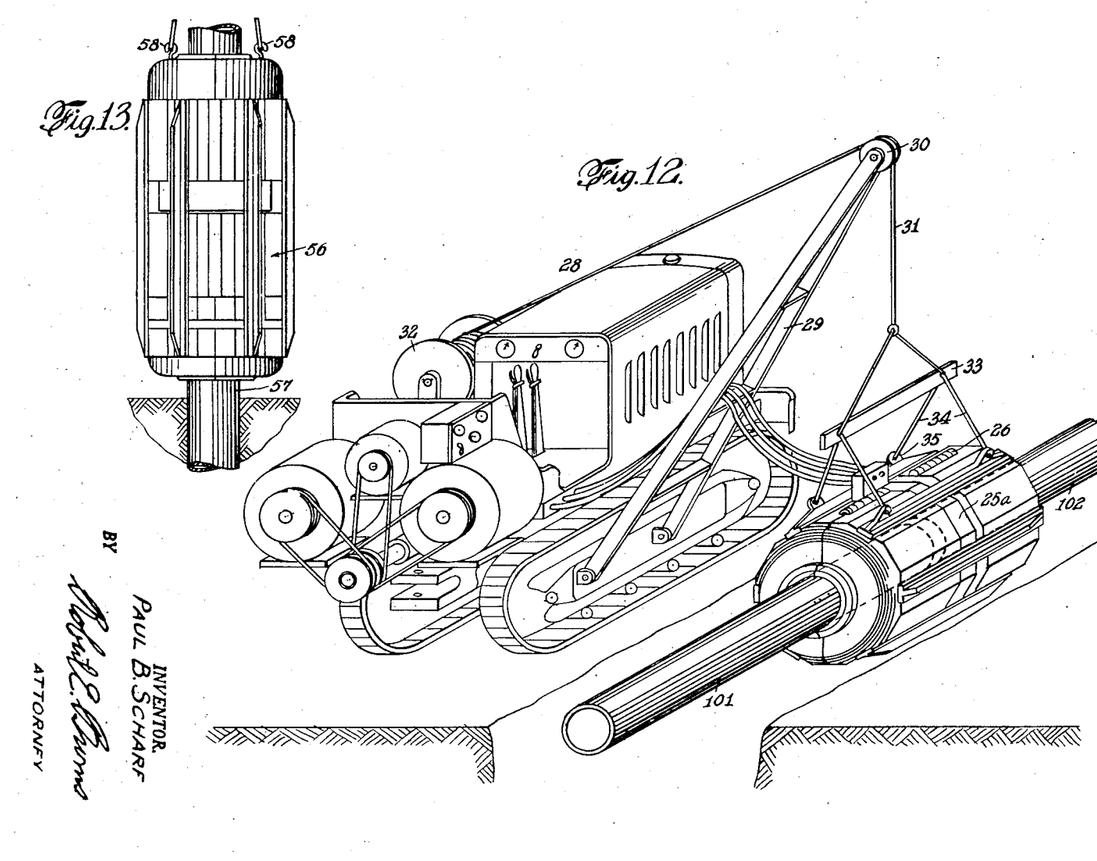
Fig. 12 is a perspective view of a motor propelled vehicle for supporting the welding apparatus illustrated in Figs. 3 to 9 and Fig. 11, and for moving it as required from one joint in a pipe line to the next adjacent joint where a welding operation is to be performed, so as to unite all of the pipe sections operated upon to form a continuous pipe line.
Fig. 13 is a diagrammatic elevation of a further exemplification of the invention.

When the apparatus just described is operated in the field, the automotive vehicle 28 is manoeuvered to proper position to support the housing 25 so that the abutting ends of adjacent pipe sections of a pipe line will lie in alignment transversely with the electrodes 104. The housing 25 will be opened by releasing the locking catch 27 and thus permitting the hinged sections of the housing to separate slightly and descend on opposite sides of the pipe sections, whereupon the two portions of the housing will be again brought together and locked by the latch 27 or its equivalent. Fluid pressure will be supplied to the gripping cylinders 49, causing the pistons 50 therein to move longitudinally and grip the pipes 101, 102 respectively in the manner previously described. The switch 107a will then be closed so as to supply electric current to the carbon arcing elements 104 and also to the motor 111, which will immediately start up and rotate the rotary frame 36 carrying the arcing elements around the pipe sections. The electrodes and their supporting mechanism will thereupon be swung outwardly by centrifugal force, or other suitable means, and produce the arcs which are carried around the pipe by the rotation of the frame at such speed as to raise the meeting edges of the adjacent pipe sections to welding temperature throughout their circumference. When the proper welding temperature has been reached, pressure fluid will be admitted to the pushing cylinders 118, causing the pistons 119 therein to move longitudinally with respect to the adjacent pipe section, and forcing the pipe sections clamped within the clamping mechanism previously described toward each other to effect the welding of the pipe sections together. It will be understood that when the current is passed through the arcing element and the motor 111, which also will pass through the electro-magnet or solenoid 42 and release the locking mechanism, which permits the rotary movement of the frame 36 under the power of the motor 111. As soon as the welding is completed, the current is broken at the contactor 107a and the arcing is interrupted, the motor 111 slows down, the magnet or solenoid 42 releases the locking lever 38 and its spring 41 forces it outwardly so that the locking projection 39 will enter the recess 40 as soon as it arrives in position to do so, thus stopping the rotation of the frame in a fixed position in which it is most readily removed from engagement with the pipes. The fluid pressure is cut off from cylinders 49 and 118 and the separable members of the housing 25 are then released from the latch 27, permitting the sections of the housing to be opened and the unit is then raised bodily and moved to the next joint to be welded, where the operations previously described are repeated.

It will be understood that in the operation of the mechanism thus described, the generation of electricity for the arcing circuits may be produced by means of a generator carried by the automotive vehicle and the fluid pressure required for the operation of the clamp controlling cylinders and pushing cylinders and their pistons may also be provided by suitable pumping mechanism mounted on the automotive vehicle or pressure reservoirs carried thereby, and suitably piped or otherwise connected with the various cylinders and controlled by suitable valves of well known construction which are not shown herein, so that a complete and self-contained field unit is provided.

While the unit shown in Figs. 3 to 12 has been described in connection with the welding of pipe in a suitable horizontal position, as for example in the laying of pipe lines, it will be understood that the invention is equally applicable to the welding of pipes in vertical or other position. For example, the process and apparatus would be adaptable to welding tubular steel piling, or to welding oil, water and gas well casing, in which application the welding unit would be mounted over the well and the casing driven down through the welding machine as the joints are successively welded. Such an arrangement is illustrated diagrammatically in Fig. 13, where the welding unit is indicated by the numeral 56 and the well casing being driven into the ground is indicated by the numeral 57. The welding unit 56 would of course be suitably supported for example by the well drilling rig (not shown) or by an automotive vehicle, as in the embodiment shown in Fig. 12, in which case hooks 58 may be provided for supporting and lifting the unit.

When more than one electrode is used it may be desirable to have half of the electrodes heat one of the edges to be welded, and the other half heat the other edge, for example by insulating the two sections from one another, and connecting the respective electrodes in separate circuits so that the electrodes will arc only to the edge they are intended to heat. This arrangement provides fast and efficient heating.

Figure 10:
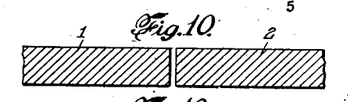
Fig. 10 is a fragmentary cross sectional view illustrating the meeting edges of the pipe section before welding.
Figure 10A:
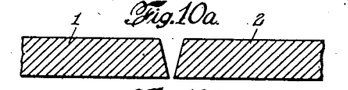
Fig. 10a is a view similar to Fig. 10 but showing the end edges slightly beveled.
Figure 10B:
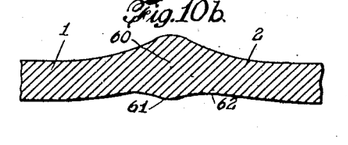
Fig. 10b is a view similar to Fig. 10 showing the completed weld.

During the heating operation the edges to be welded may be separated or they may be abutted with any desired degree of pressure. It will be understood that unless welding pressure is already applied the two edges will be forced together when welding temperature has been reached so as to effect a weld. The end edges prior to welding may be square, as shown in Fig. 10, or may be inwardly or outwardly beveled as indicated in Fig. 10a. When the heated edges are pressed together to effect a weld, the metal is upset to cause a slight thickening of the material at the weld line, as indicated at 60 in Fig. 10b. In welding pipe lines it is particularly desirable for the inner periphery 61 of the weld line to be of a diameter not less than the inner diameter of the pipe and to be smooth and uniform so that there are no inwardly projecting beads or flashings that would impede the flow of fluid through the pipe line, or obstruct the passage of cleaning tools. In accordance with my invention this result is achieved by the formation of a smooth, uniform weld line, and by belling the meeting ends of the pipe out slightly so that the inner periphery 61 of the weld line is of a diameter not less than the inner diameter of the pipe. The belling of the ends can be performed before the ends are welded. However, it has been found that in carrying out my invention, the ends of the pipe automatically bell outwardly when the two pipe sections are pressed together to effect the weld, so that prior belling is ordinarily unnecessary.

It will be understood that the term "pipe" as used in the foregoing description and accompanying claims is to be construed broadly to include tubular pilings, well casings, and other cylindrical sections. It will further be understood that the expression "jumps from spot to spot" as used in the description and claims is to be construed as meaning that successive spots of impingement of the arc upon the work are spaced from one another. Moreover, while the apparatus shown by way of example in the drawings is particularly adapted to welding cylindrical sections, it will be understood that my improved process is equally applicable to welding flat or curved plates or other shapes.

What I claim and desire to secure by Letters Patent is:

1. In apparatus for welding the meeting ends of cylindrical sections, the combination of an electrode carrier rotatable about said sections, driving means for rotating said carrier, an electrode movably carried by said carrier, means for supplying electric current to said electrode, resilient means for pressing said electrode into contact with said sections when said carrier is stationary, said electrode being movable outwardly by centrifugal force upon rotation of said carrier to draw an arc between said electrode and said sections, and means for limiting the outward movement of said electrode.

2. In apparatus for welding the meeting ends of cylindrical sections, the combination of a split track encircling said sections, means for supporting said track in predetermined position relative to said sections, an electrode carrier rotatable around inside of said track, a plurality of circumferentially spaced electrodes supported by said carrier in arcing relation with the ends of said sections, means for supplying electric current to said electrodes, and driving means for rotating said electrode carrier at high speed to heat said ends uniformly throughout their circumferential extent by the heating action of the rapidly traveling arc.

3. In apparatus for welding the meeting ends of cylindrical sections, the combination of a split track adapted to encircle said sections, means for supporting said track in predetermined position relative to said sections, a carriage rotatable around inside said track, an arcing element supported by said carriage in heating relation to said ends, means for supplying electric current to said arcing element, and driving means carried by said carriage for rotating the carriage around said track at sufficient speed to heat said ends uniformly throughout their circumferential extent by the heating action of the rapidly traveling arc.

4. In apparatus for welding the meeting ends of cylindrical sections, the combination of an open U-shaped carriage capable of being placed on and removed from said sections by movement in a direction transverse to the axis thereof, said carriage being rotatable about said sections when in operative position thereon, an arcing element supported by said carriage in heating relation to said ends, means for supplying electric current to said arcing element, and driving means for rotating said carriage.

5. In apparatus for welding the meeting ends of cylindrical sections, the combination of a split housing comprising arcuate portions hingedly connected together, means for locking said housing portions about the sections to be welded, means for gripping each of said sections and holding them in alignment with one another, a carriage rotatable about said sections adjacent the ends to be welded said carriage opening at one side for removal in a direction transverse to said sections, an arcing element carried by said carriage in arcing relation to said ends, means for supplying electric current to said arcing element, and means for rotating said carriage to carry the arc produced by said element rapidly around said cylindrical sections in arcing relation to said meeting ends to heat said ends to welding temperature substantially simultaneously throughout their circumferential extent.

6. In apparatus for welding the meeting ends of cylindrical sections, the combination of a split track encircling said sections adjacent the ends to be welded, means for positioning said track in predetermined relation to said sections, a carriage rotatable about said sections on said track and opening at one side for removal from said sections with said track in a direction transverse to said sections, an arcing element supported by said carriage in arcing relation to said meeting ends, means for supplying electric current to said arcing element, driving means for rapidly rotating said carriage, and a latch for stopping and holding said carriage in predetermined position relative to said track to permit its removal with said track from said sections.

7. In apparatus for welding the meeting ends of cylindrical sections, the combination of a track encircling said sections, adjacent the ends to be welded, a carriage rotatable about said sections on said track, an arcing element supported by said carriage in heating relation to said meeting ends, an electric motor for rotating said carriage, an electrically operated latch for stopping and holding said carriage in predetermined position relative to said track, a supply of electric current, and control means for coordinating the supply of current to said arcing element, driving motor and latch.

8. The herein described method of welding abutting ends of electrically conductive cylindrical sections, which comprises bringing an arc forming carbon element movable toward and from said sections into contact with the meeting ends of adjacent sections, supplying electric energy to said element and said sections, rotating said element around the abutting portions of said sections at sufficient speed to set up centrifugal force sufficient to move said element a predetermined distance away from said sections to bring it into arcing relation to said sections, and thereby establish an arc between said element and the ends of said sections, and continuing said rotation while maintaining said arc to heat the meeting ends of said sections to welding temperature throughout their circumference, and pressing said sections together while the meeting edges are at welding temperature.

9. The method of welding together the abutting end surfaces of electrically conductive cylindrical sections which comprises striking and maintaining an electric arc between an arcing element and the end portions of said sections while effecting rapid relative rotation between said sections and element at a rate of speed sufficiently high to cause the arc to move by jumps from spot to spot along a narrow path extending around the circumference of said section, producing areas of high current concentration at said spots and heating a narrow band of material adjacent said weld surfaces concurrently throughout its entire circumferential extent, continuing said arcing and rotation until said surfaces are heated throughout to welding temperature and pressing said surfaces together to effect a weld.

10. In apparatus for welding the meeting ends of cylindrical sections, the combination of a split housing comprising arcuate portions hingedly connected together and adapted to open about said hinge, a split track adapted to open with said housing, a carriage rotatable about said track, means for retaining said carriage when said housing and track are open, an arcing element carried by said carriage in arcing relation to said ends, means for supplying electric current to said arcing element, and means for rotating said carriage about said track.

11. The herein described method of welding the abutting ends of electrically conductive cylindrical sections, which comprises revolvably supporting an electrode in arcing relation with portions adjacent the meeting ends of said sections and supplying electric current to form an arc between said electrode and sections, maintaining said current while rotating said electrode about the sections to cause the impingement of said arc with said sections to travel repeatedly along a narrow path on each of said sections adjacent the surfaces to be welded at a rate of speed sufficient to cause the arc to move by jumps from spot to spot along said path, producing areas of high current concentration at said spots to heat a narrow band of material adjacent said surfaces to bring said surfaces uniformly to welding temperature concurrently throughout their circumferential extent, and pressing said surfaces together to effect a weld.

12. The method of welding abutting ends of electrically conductive cylindrical sections, which comprises establishing a plurality of electric arcs between the abutting ends of said sections and a plurality of arc forming elements spaced circumferentially of said sections, effecting relative rotation between said elements and said sections to cause the impingement of said arcs with said sections to travel repeatedly along a narrow path on each of said sections adjacent the surfaces to be welded at a rate of speed sufficient to cause the arc to move by jumps from spot to spot along said path, producing areas of high current concentration at said spots to heat a narrow band of material adjacent said surfaces to bring said surfaces uniformly to welding temperature concurrently throughout their circumferential extent, and pressing said surfaces together to effect a weld.

13. The method of circumferential welding of electrically conductive cylindrical sections, which comprises pressing the areas to be welded into contact with one another, establishing an electric arc between an arc forming element and a path on said sections adjacent said weld areas, establishing relative rotation between said sections and said element to cause the impingement of said arc with said sections to travel repeatedly along a narrow path on each of said sections adjacent said areas at a rate of speed sufficient to cause the arc to move by jumps from spot to spot along said path, producing areas of high current concentration at said spots to heat a narrow band of material adjacent said areas to bring said areas uniformly to welding temperature concurrently throughout their circumferential extent, while maintaining pressure between said areas to effect a weld.

14. The method of circumferential welding of electrically conductive circular sections, which comprises bringing the areas to be welded into contact with one another, establishing a direct current electric arc between a carbon cathode and surfaces on said sections adjacent said weld areas which constitute the anode, effecting relative rotation between said sections and said cathode to cause the impingement of said arc with said sections to travel repeatedly along a path on each of said sections adjacent said areas at a rate of speed sufficient to cause the arc to move by jumps from spot to spot along said path, producing at each point of impingement an anode spot of high current concentration to heat a band of material adjacent said areas to bring said areas uniformly to welding temperature concurrently throughout their circumferential extent, and pressing said areas together to effect a weld.

15. The herein described method of welding metal sections, which comprises establishing an electric arc between said sections and an arc forming element, while effecting relative movement between said sections and said arc to cause the impingement of said arc with said sections to travel repeatedly along a narrow path on each of said sections adjacent the surfaces to be welded at a rate of speed at least of the order of hundreds of inches per minute to cause the arc to move by jumps from spot to spot along said path to heat a narrow band of material adjacent said surfaces to bring said surfaces uniformly to welding temperature concurrently throughout their circumferential extent, and pressing said surfaces together to effect a weld and continuing the travel of said arc along said path during said pressing.

16. The herein described method of welding metal sections, which comprises establishing an electric arc in arcing relation between said sections and an arc forming element, effecting relative movement between said sections and said arc to cause the impingement of said arc with said sections to travel repeatedly along a narrow path on each of said sections adjacent the surfaces to be welded at a rate of speed sufficient to cause the arc to move by jumps from spot to spot along said path, producing areas of high current concentration at said spots to heat a narrow band of material adjacent said surfaces to bring said surfaces uniformly to welding temperature concurrently throughout their circumferential extent, and pressing said surfaces together to effect a weld, and continuing the arc between said sections and said element and the relative movement of the arc and sections for a predetermined period after pressing said edges together.

17. The herein described method of heating a selected band of an electrically conductive member, which comprises supporting an electrode in arcing relation to a narrow path adjacent to said band, striking an electric arc between said electrode and said path, effecting relative movement between said electrode and said member to cause the impingement of said arc with said member to travel repeatedly along said path at a rate of speed at least of the order of hundreds of inches per minute to cause the arc to move by jumps from spot to spot along said path to heat a narrow zone of material along said path to bring said band uniformly to a desired temperature substantially simultaneously throughout its entire extent.

18. The herein described method of heating a defined band of an electrically conductive member which comprises striking an electric arc between an arcing element and said band and effecting relative movement between said element and said member to cause the impingement of said arc with said member to travel repeatedly along said band at a rate of speed sufficient to cause the arc to move by jumps from spot to spot along said band, producing areas of such high current concentration at said spots as to heat said band substantially simultaneously throughout its extent predominately by resistance heat generated within the material of said band.

PAUL B. SCHARF.

REFERENCES CITED

The following references are of record in the file of this patent:

UNITED STATES PATENTS

| Number | Name | Date |
|---|---|---|
| 444,855 | Ries | Jan. 20, 1891 |
| 808,186 | Benjamin | Dec. 26, 1905 |
| 1,233,434 | Zuck | July 17, 1917 |
| 1,775,311 | Halle | Sept. 9, 1930 |
| 2,013,630 | Goldsborough | Sept. 3, 1935 |
| 2,250,869 | Jones et al. | July 29, 1941 |
| 2,286,212 | Gorn | June 16, 1942 |
| 2,344,939 | Bennett | Mar. 28, 1944 |
| 2,350,716 | Bissout et al. | June 6, 1944 |
| 2,354,267 | Lytle et al. | July 25, 1944 |
| 2,371,090 | Westin et al. | Mar. 6, 1945 |